3,348,966
PREPARATION OF BLISTER-FREE ELASTOMERIC FILMS AND COATINGS
Charles W. Simons, Bedford, and Irving J. Arons, West Peabody, Mass., assignors to W. R. Grace & Co., Cambridge, Mass., a corporation of Connecticut
No Drawing. Filed Apr. 15, 1964, Ser. No. 360,083
15 Claims. (Cl. 117—95)

This invention relates to films and coatings of elastomers. In one aspect it relates to a method of preparing blister-free films and coatings of elastomeric polymers and to solvent-based rubber compositions useful therein. More particularly, it is concerned with the preparation of elastomeric films and coatings from solvent solutions of natural and synthetic elastomers which may be rapidly cured and dried without disruption of the resulting film.

It is known to use solvent solutions of elastomers for coating leather, textiles, metal, paper, and other substrates in the manufacture of coated and laminated articles. Such compositions have also found utility in the manufacture of meterological balloons, footwear and other goods prepared by dipping techniques. In the container art, rubber solutions have been employed in the formation of sealing gaskets for aerosol mounting cups, can ends and other types of container closures.

In making these and other products it has been customary to use rubber solutions containing low boiling solvents. These compositions are deposited on a substrate by coating, lining or other appropriate means and are completely dried before the elastomeric component is cured. In the preparation of relatively thick films and coatings, the application step is usually repeated until the desired film thickness is obtained. When applying several layers of solution in this manner, substantially all of the solvent is removed from each thin layer of solution as it is deposited, and finally, the dried mass is cured.

These methods of preparing films and coatings have certain inherent drawbacks, as well-recognized in the art. Among the major disadvantages are the lengthy drying times, the frequent occurrence of blistering and other difficulties encountered in removing the solvent from the uncured composition. Because of the low boiling points of the solvents ordinarily employed, the deposited solution may be air-dried at ambient temperatures. Under these conditions blistering of the film is usually negligible, but drying times are excessive. For instance, at least a day has been required for removing substantially all of the solvent from relatively thin films, i.e., films having a dried thickness of about 3 to 5 mils. However, in most manufacturing processes it is desirable to shorten drying times as much as possible in order to achieve greater speed and economy of operation. Therefore, it has been preferred to hasten the drying step by effecting solvent removal at elevated temperatures.

Though high temperature drying greatly accelerates the volatilization of the solvent, drying times for rubber solutions have remained relatively lengthy. Moreover, high temperature drying has required careful planning and strict supervision especially with regard to temperature control. For example, experience has shown that the solution gradually solidifies as it dries and that the mass congeals before all of the solvent has escaped, particularly from the deeper layers of deposit. Since the deposit is uncured, it is easily disrupted by any substantial increase in the rate at which the remaining solvent volatilizes from the composition. Unless the temperature is carefully maintained within a certain range, the solvent will volatilize too rapidly and cause the formation of voids, blisters, blow-holes, and other imperfections in the deposit. Once these imperfections have formed in the dried mass, they will persist during the subsequent curing step to give films and coatings having internal or surface defects.

Various attempts have been made to overcome these disadvantages, but none of the methods proposed has been entirely satisfactory. For instance, it has been suggested to raise the drying temperature above the ranges normally employed. While a significant reduction in drying time may be obtained, this procedure has resulted in an increase in blistering and actual disruption of the film. It has also been proposed to include an initial air-drying step so that the total amount of solvent may be decreased before the deposit is subjected to high temperature drying. Relatively satisfactory films may be obtained in this manner, but the improvement in film continuity achieved by this method is offset by the increase in drying time due to the addition of the air-drying step. Because the extent of blistering has depended primarily upon the rate of volatilization of the solvent, it has been extremely difficult to shorten drying times and at the same time prevent the formation of film defects.

The present invention provides a method of preparing elastomeric films and coatings that overcomes the drawbacks found in prior methods. In essence, the method comprises reversing the usual order of the drying and curing steps in that the deposited film is cured before any substantial portion of the solvent is volatilized. Consequently, the remaining solvent may be rapidly expelled from the deposit since the cured film has sufficient strength to withstand the disrupting forces created by the escaping solvent. More specifically, the method of the present invention comprises depositing a layer of a solution of a curable elastomeric polymer dissolved in a high boiling volatile organic solvent on a substrate, curing said polymer at a temperature below the boiling point of the solvent and thereafter volatilizing substantially all of said solvent.

Accordingly, it is now possible to dry rubber solutions with great rapidity at elevated temperatures without the formation of film imperfections. In the present method, cured films and coatings having a thickness in the range of 20 to 30 mils may be dried in less than twenty minutes as opposed to the normal drying period of one to two hours. Drying may be carried out at temperatures above the normal range of 150° F. to 250° F. without an initial air-drying step and without the care of watchfulness previously required. Despite the rapid volatilization of the solvent and the high drying temperatures employed, the resulting films are free from voids, blisters and other defects. Moreover, it is now possible to prepare relatively thick elastomeric films and coatings (up to approximately 30 mils dried thickness) from a single thick deposit of rubber solution whereby the time-consuming procedure of applying and drying multiple layers of solution may be avoided.

In carrying out the invention, a high boiling elastomeric solution is deposited on a substrate by coating, brushing, spreading, nozzle-lining or in any other convenient manner using any of the machinery conventionally employed for these purposes. Thereafter, the substrate with the deposit is heated at a temperature below the boiling point of the solvent for a time sufficient to effect complete curing of the elastomer. Preferably, the deposit is heated at a temperature at least 80 degrees (Fahrenheit) below the boiling point of the solvent. After the composition is cured, the deposit is heated further until the cured layer is substantially dry.

Where it is desirable to increase overall efficiency in the preparation of films and coatings, curing of the polymer and solvent removal are effected as quickly as possible. In this instance the curing temperature selected is one at which curing of films and coatings having a dried thickness up to 30 mils will be complete in less than 15 minutes. It has been found that temperatures in the range of about 150° to 240° F. are satisfactory for accomplishing rapid curing of sulfur-curing compositions containing a highly active curing system. With respect to the drying of the composition, it is preferred to remove substantially all of the solvent in less than about 20 minutes by heating the cured film at a temperature at which the solvent is rapidly volatilized and expelled from the mass. Consequently, the particular drying temperature employed depends upon the boiling point or boiling range of the solvent. For example, when elastomeric solutions containing high boiling solvents are cured at a temperature of about 240° F., the cured film is dried at a temperature between about 300° and 400° F. While it is desirable to remove the solvent as quickly as possible, drying at very high temperatures should be brief in order to prevent overcuring and degradation of the elastomeric polymer.

The compositions used in carrying out the method of the present invention comprise an elastomeric polymer, a high boiling volatile organic solvent for the elastomeric polymer and a fast-curing system comprising a curing agent and a curing accelerator. Preferably the high boiling solvent is a mixture of volatile organic liquids, one which solvates the elastomer and another which behaves as a diluent. Pigments, fillers, antioxidants, plasticizers, and other conventional compounding ingredients may be included to impart certain properties to the composition during processing and to the cured elastomeric articles produced therefrom.

The total solids concentration may vary from about 20 to 70 percent by weight depending upon the application for which the composition is to be used and the type of equipment employed in applying the solution. In general, compositions of relatively high solids concentration, i.e., of the order of 50 to 70 percent, are preferred in the preparation of thick films and coatings, such as, in the manufacture of coated fabrics and "flowed-in" gaskets where the elastomeric solution is deposited in a single pass through the coating or lining machinery. On the other hand, compositions of low percentage total solids are useful in applications where thin films and coatings are desired, e.g., in the manufacture of goods prepared by dipping and cast-molding techniques.

Among the elastomeric polymers suitable for use in preparing these compositions are natural rubber; polymers and copolymers of conjugated diolefins, e.g., polybutadiene, butadiene-styrene copolymers, butadiene-acrylonitrile copolymers; polymers and copolymers of chlorine-substituted conjugated diolefins, e.g., polychloroprene; and polymers of non-conjugated systems, e.g., polyisobutylene and isobutylene-isoprene copolymers. Other elastomeric polymers which may be used include vinyl-type polymers and copolymers, e.g., polyacrylates, and condensation polymers of the polyester and polysulfide type.

The selection of a solvent for use in preparing the elastomeric compositions depends, of course, upon the solubility characteristics of the elastomer employed. Though different elastomeric polymers may be soluble in the same solvent, polymers derived from different chemical sources usually behave very differently in a given solvent. Likewise, polymers from the same chemical source, but having different ratios of monomer in the resulting copolymers or different molecular weight due to different degree of polymerization may be soluble or insoluble in a given solvent depending upon the particular monomeric ratio and resultant molecular weight.

In the present invention the suitability of a solvent also depends upon its boiling point which should be at least 80 degrees Fahrenheit above the temperature at which curing of the composition is effected. At the same time, the boiling point should be in a range that will allow solvent removal without thermal degradation of the particular elastomer employed. In general, solvents having a boiling point or boiling range between about 320° and 400° F. are suitable for compositions cured at a temperature of about 240° F. The span between the curing temperature and boiling point of the solvent is essential to allow curing of the film and, consequently, the formation of adequate film strength while the vapor pressure of the solvent is comparatively low. Otherwise, the vapor pressure of the solvent at curing temperatures would be sufficient to disrupt the deposited layer before any substantial curing of the elastomeric material had taken place.

Solvents which may be employed in preparing the elastomeric solutions include aliphatic and aromatic hydrocarbons, e.g. 3-methylheptane and xylene; chlorinated and nitrated hydrocarbons, e.g. dichloropentane and 1-nitropropane, ketones and esters, e.g., ethyl-n-butyl ketone and 1,3-dimethylbutyl acetate. Other suitable solvents are alcohols, ethers, and ether-alcohols, e.g., amyl alcohol, butyl ether and 2-butoxyethanol. Also, mixtures of organic liquids selected from the various classes of solvents may be used which meet the requirements stated above. If desired, combinations of volatile organic liquids which together form a solvent for the selected elastomer may be used. In the present invention it is preferred to use a diluent in conjunction with a solvating organic liquid where it is desirable to reduce the viscosity of the elastomeric solution. The term "solvent" as used in the specification and in the claims refers to the solvating medium for the elastomer and includes a single solvent, mixtures of solvents, diluents in admixture with solvents, and mixtures of organic liquids which together form a solvent for the elastomer.

As mentioned above, it is desirable to insure the formation of adequate film strength before the solvent is rapidly volatilized. Therefore, it is essential to use a curing accelerator in conjunction with the curing agent so that curing of the composition may be effected as quickly as possible. The preferred curing accelerators in the present method are the rapidly-acting organic compounds commonly referred to as "ultra-accelerators," such as, the dithiocarbamates. If desired, mixtures of accelerators may be employed which contain an ultra-accelerator. Also, activators may be included in the curing mixture. Activators are generally defined as compounds which accelerate the curing rate when used in combination with an accelerator but which do not promote curing when used alone.

Among the curing agents which may be used for sulfur-curing elastomers are elemental sulfur, selenium, tellurium, and so forth. Other curing agents which may be employed are dipentamethylene thiuram tetrasulfide, tetramethyl- and tetraethylthiuram disulfides, selenium diethyldithiocarbamate and other sulfur-containing compounds, many of which are also used as accelerators. For sulfur-curing elastomers in general, it is preferred to use elemental sulfur in conjunction with an ultra-accelerator. For non-sulfur curing elastomeric polymers, peroxides, quinone dioxime, and zinc and other metallic oxides may be used depending upon the type of elastomer employed. For example, benzoyl peroxide may be used as a curing agent for silicones, zinc and magnesium oxides for polychloroprenes, zinc peroxide or p-quinone dioxime-zinc oxide for some of the polysulfides, metasilicate for certain acrylate rubbers and so forth.

Accelerators which are suitable for use in conjunction with the curing agent may be of the aldehyde-amine, guanidine, thiuram sulfide, thiazole, thiourea, xanthate, dithiocarbamate, or mercaptothiazoline type. However, tetramethyl thiuram monosulfide and disulfide, tetraethyl- and tetramethylthiuram disulfides, copper and zinc di- methyldithiocarbamates, zinc, selenium and tellurium diethyldithiocarbamates, and other comparatively fast acting accelerators, are preferred. An accelerator which is particularly suitable for use in admixture with sulfur is "Butyl Eight," a complex formulation of the activated dithiocarbamate type. Activators which may be used with the curing agent and accelerator include inorganic substances, such as, zinc oxide and litharge, and organic compounds, such as, zinc salts of fatty acids, di-n-butylammonium oleate, and 1,3-diphenylguanidine phthalate.

The amounts of the constituents used in preparing the elastomeric compositions of the present invention may vary widely. For example, the amount of solvent may vary from about 50 to 500 parts by weight and, preferably, from about 50 to 250 parts by weight based on 100 parts by weight of elastomer. When fillers and other compounding materials are incorporated into the composition, the solvent is used in approximately the same proportions given above but is based on the total solids present, i.e., the combined weight of the elastomer, fillers, curing mixture, and other ingredients. A typical formulation on a weight basis would be 100 parts rubber, 100 parts calcium carbonate, 20 parts curing ingredients, and 180 parts solvent. Though compositions containing less than 50 parts by weight solvent may also be used in the present invention, these compositions are ordinarily considered plasticized rubbers rather than rubber solutions. Above 500 parts by weight solvent, it is difficult to obtain continuous void-free films because of the exceedingly large volume change between the wet and dried deposits due to the high proportion of solvent to solids.

When preparing filled compositions, the quantity of fillers may be varied over a relatively wide range, for instance, 0 to 300 parts by weight filler based on 100 parts by weight rubber. The fillers are not essential, but their use is desirable in many applications for reducing the viscosity of the composition, for reducing the quantity of rubber required, and also, for imparting certain properties to the finished film or coating.

The quantities of curing agent, accelerator, and/or activator used are within the ranges conventionally employed. For example, the amount of curing agent, e.g. elemental sulfur, used is in the range of 2 to 3 parts by weight based on a hundred parts by weight elastomer. The ultra-accelerator and activators are used in amounts of about 2 to 4 parts by weight and 5 parts by weight, respectively. For all practical purposes, it is necessary to use only the amounts of each of the curing ingredients which will effect a rapid and complete cure of the elastomeric constituent, i.e. the amounts that will effect curing of a film having a dried thickness up to about 30 mils in less than 15 minutes at a given curing temperature. Likewise, when softeners, antioxidants, plasticizers, and other compounding ingredients are included in the composition, they are used in conventional amounts.

The compositions used in the present invention are prepared by milling the rubber, filler, curing agent, and other ingredients, except the ultra-accelerator, in a Banbury internal mixer, two-roll rubber mill or other conventional rubber compounding equipment. After a smooth homogeneous mixture is obtained, the batch is solvated in a suitable organic solvent. Though the accelerator may be added to the composition at this time or during compounding, it is preferred to add the ultra-accelerator immediately before use. Otherwise, gelling of the composition may occur due to partial curing upon standing.

Generally, it is also preferred to deaerate the composition at the time of or prior to its application since air may become entrapped in the composition during compounding or with stirring during the solvating step. The presence of tiny air bubbles in the deposit may result in the formation of minute voids or pin-holes in the resulting films. Deaeration may be accomplished by stirring or depositing the composition under vacuum or in any other convenient manner.

The following examples are given to further illustrate the present invention. All quantities given are in parts by weight unless otherwise specified.

*Example 1*

| Ingredient: | Parts by wt. |
|---|---|
| Natural rubber (smoked sheet) | 100 |
| Pentachlorothiophenol (chemical plasticizer) | 1 |
| Stearic acid (processing aid) | 2 |
| Sym-di-β-naphthyl-p-phenylenediamine (antioxidant) | 1 |
| Zinc oxide (activator) | 5 |
| Calcium carbonate (filler) | 300 |
| White oil (softener) | 6 |
| Benzothiazyldisulfide (curing accelerator) | 1 |
| Elemental sulfur (curing agent) | 2 |

The rubber, pentachlorothiophenol, and stearic acid were charged into a cold Banbury mill. The mixing operation was carried out in a conventional manner with the zinc oxide, di-β-naphthyl-p-phenylene diamine, and a portion of the calcium carbonate being added alternately with the white oil. After the preliminary mixing, the batch was transferred to a cold two-roll rubber mill where the remainder of the filler, the sulfur, and the benzothiazyldisulfide were added. After a smooth blend was obtained, the masterbatch was sheeted out and then cut into small pieces.

The above masterbatch was divided into two portions and two solutions, A and B, were then prepared from these portions. Solution A was made by solvating one portion of the masterbatch in a low boiling solvent, viz. hexane, which has a boiling point of about 156° F. Solution B was prepared by solvating the other portion of the masterbatch in a 3 to 1 mixture of a high boiling aromatic and a high boiling aliphatic petroleum solvent. The aromatic solvent employed was "Solvesso 100" having a boiling range of approximately 321° to 354° F. and the aliphatic solvent employed was "Varsol #1" having a boiling range of approximately 321° to 388° F. The percentage total solids of solutions A and B was adjusted to the respective values set forth in Table I below.

As indicated in Table I, an ultra-accelerator was added to solution B. The ultra-accelerator employed was an activated dithiocarbamate type ("Butyl Eight") and was used in an amount of four parts by weight per hundred parts by weight elastomer.

Two films were prepared from each solution by depositing portions of the solutions on each of two metal foil discs. Each deposit was of sufficient thickness to give a dried coating of approximately 20 mils. One film from each solution was prepared according to the heating cycle designated (a) in Table I and the other film was prepared according to the heating cycle designated as (b). Specifically, one set of samples was heated in an oven for one hour at 210° F. followed by an additional heating period of one hour at 300° F. The duplicate set of samples was air-dried at room temperature for one hour and then heated for one hour at 150° F. and for thirty minutes at 280° F. Thereafter, the resulting films were inspected for degree of cure and for the occurrence and extent of blistering.

The formulations of the comparative solutions and the appearance of the films prepared from each are given in Table I below.

TABLE I

| Solution | Parts by Weight | |
|---|---|---|
| | A | B |
| (A) Components: | | |
| Masterbatch of Example 1 | 60 | 60. |
| Hexane, boiling pt. 156° F. | 30 | |
| Aromatic petroleum solvent, min. boiling pt. 321° F. | | 30. |
| Aliphatic petroleum solvent, min. boiling pt. 321° F. | | 10. |
| Activated dithiocarbamate, ultra-accelerator, phr.* | | 4. |
| Total Solids, percent | 67 | 60. |
| (B) Properties: | | |
| (a) Heating cycle: 1 hr. at 210° F.: | | |
| (1) Blisters | Many | None. |
| (2) Cure | Partial | Complete. |
| Plus 1 hr. at 300° F.: | | |
| (1) Blisters | Many | None. |
| (2) Cure | Partial | Overcured. |
| (b) Heating cycle: 1 hr. at room temp. and 1 hr. at 150° F.: | | |
| (1) Blisters | Many | None. |
| (2) Cure | Partial | Complete. |
| Plus 30 min. at 280° F.: | | |
| (1) Blisters | Many | None. |
| (2) Cure | Partial | Overcured. |

*Parts per hundred rubber.

As noted in Table I, the films prepared from the high boiling solution containing a fast-acting curing system were entirely free from blisters and other imperfections while the films prepared from the low boiling, slow curing composition were defective. Because of the rapid cure obtained with solution B, the films prepared from this solution were able to withstand the rapid escape of the solvent at higher temperatures without blistering. Moreover, the films from solution A were only partially cured even with the lengthy heating cycles employed, and the films were still tacky at the end of both heating periods. In comparison, the films from solution B were cured, i.e., the films were non-tacky after 1 hour at 210° F. in heating cycle (a) and after 1 hour at 150° F. in heating cycle (b). However, the films from solution B became over-cured and degraded upon additional heating.

In order to determine the heating conditions that would avoid over-curing and still give blister-free films, additional films were prepared from solution B using the following heating cycles:

(c) 5 minutes at 300° F.
(d) 5 minutes at 240° F. plus 5 minutes at 300° F.
(e) 10 minutes at 240° F. plus 10 minutes at 300° F.
(f) 10 minutes at 240° F. plus 2 minutes at 400° F.

The films prepared had a thickness between about 20 and 30 mils. The deposit heated according to (c) was cured but blistered and some solvent retention was noticeable. From these results it is apparent that solvent was rapidly volatilized before any substantial curing of the film had taken place thereby causing blistering. The deposit heated according to (d) was cured and only slightly blistered but the initial cure obtained in 5 minutes at 240° F. was not sufficient to prevent blistering as solvent was rapidly expelled at 300° F. This film also showed some solvent retention. However, the initial cure obtained in 10 minutes at 240° F. in heating cycles (e) and (f) was sufficient to give films tough enough to withstand blistering even when the solvent was forceably expelled at 400° F. However, the film prepared in (f), though blister free, became over-cured during the latter-half of the heating cycle. It was found that over-curing could be prevented by reducing the heating time at 400° F. to about 1 minute. Substantially all of the solvent was removed from the blister-free films prepared according to (e) and (f) with less than half of the total solvent present being removed during heating at 240° F.

It is apparent from the above that curing of the deposit must take place while the vapor pressure of the solvent is comparatively low and therefore, before the solvent is rapidly volatilized and expelled from the deposit. Otherwise, blistering of the film will occur. Also, it is apparent that curing of relatively thick deposits of a fast curing rubber solution may be accomplished in a comparatively brief time, e.g., 10 minutes, and that the subsequent removal of the residual solvent may also be accomplished very rapidly, e.g. in 1 to 10 minutes, depending upon the drying temperature selected.

Example 2

| Ingredient: | Parts by wt. |
|---|---|
| Natural rubber (smoked sheet) | 100 |
| Pentachlorothiophenol | 1 |
| Stearic acid | 2 |
| Sym-di-β-naphthyl-p-phenylene-diamine | 1 |
| Zinc oxide | 5 |
| Calcium carbonate | 250 |
| White oil | 10 |
| Elemental sulfur | 2.5 |
| Activated dithiocarbamate (ultra-accelerator) | 4 |

The ingredients were mixed together according to the procedure described for Example 1 above. The resulting batch was then solvated in a 3 to 1 mixture consisting of a high boiling aromatic solvent ("Solvesso 100") and a high boiling aliphatic solvent ("Varsol #1"). The total solids concentration of the elastomeric solution was adjusted to approximately 62% and the solution was vacuum stirred at room temperature. Portions consisting of 210 cc. of this solution were lined in the annular sealing area of each of several aerosol mounting cups using standard closure lining machinery. The cups with the deposited layers were heated for a total of 30 minutes according to the following schedule: 10 minutes at 200° F., 10 minutes at 240° F., and 10 minutes at 300° F. The deposits were completely cured at 240° F. and after drying at 300° F., gaskets were obtained that were free from internal and surface defects.

Other gaskets were prepared by lining the annular sealing area of aerosol mounting cups with 210 cc. of the same elastomeric solution. The cups with the deposits were heated for 10 minutes at 240° F. to cure the deposit and for an additional 10 minutes at 300° F. to remove the solvent. The resulting gaskets, which had a dried thickness of approximately 25 mils, were completely cured and free from blisters, pinholes and other imperfections. Also, there was substantially no solvent retention though the heating time was comparatively brief and the surface area of the deposited gasket relatively small in relation to its thickness.

Other formulations were prepared that were similar to the masterbatch of Example 2 and according to the same procedure described in Example 2.

The formulations prepared were identical in composition except that the quantities of calcium carbonate, elemental sulfur and white oil were varied between 200 and 300, 2 and 3, and 7 and 13 parts by weight, respectively. Solutions were made from these batches using a 3 to 1 mixture of "Solvesso 100" and "Varsol #1" and were adjusted to a total solids concentration ranging from 58 to 70 percent.

After vacuum stirring at room temperature, portions of the resulting solutions were lined in aerosol mounting cups as described in Example 2 above. The cups with the solutions were heated for 10 minutes at 240° F. to cure the deposits and thereafter heated at 300° F. to completely dry the deposits. The resulting gaskets were free from blisters and other inperfections and in pack tests showed excellent sealing performance with respect to minimal micro-leakage.

Example 3

| Ingredients: | Parts by wt. |
|---|---|
| Butadiene—acrylonitrile copolymers; approx. 35% nitrile ("Paracril C") | 100 |
| Stearic acid | 1 |
| Zinc oxide | 5 |
| Calcium carbonate | 300 |
| Elemental sulfur | 2 |

The above ingredients were mixed together on a cold two-roll rubber mill until a homogeneous mixture was obtained. The mix was then sheeted out and after being cut into small pieces, was solvated in a 3 to 1 mixture of an aromatic petroleum solvent ("Solvesso 100") and diisobutyl ketone. The boiling points of these solvents were 321°–345° F. and 334° F., respectively. The aromatic solvent was used as a diluent in this solution since the butadieneacrylonitrile copolymer is not solvated by this substance. The total solids of the resulting solution was adjusted to approximately 50% and the solution was then stirred under vacuum at room temperature to remove entrapped air.

Example 4

Another masterbatch was prepared in the same manner as described in Example 3 which contained the same ingredients in the same amounts except for the calcium carbonate which was used in an amount of 250 parts by weight. This masterbatch was solvated in the same solvent mixture used in Example 3, i.e., a 3 to 1 mixture of "Solvesso 100" and diisobutyl ketone. The total solids concentration was adjusted to about 53%. Thereafter, an activated dithiocarbamate curing accelerator ("Butyl Eight") was added to the solution in an amount of 4 parts by weight based on 100 parts by weight elastomer. The resulting activated solution was then stirred under vacuum at room temperature to remove entrapped air.

Two films, (a) and (b), were prepared from the solution of Example 3 by spreading portions of the solution on strips of metal foil. One film, 3(a), was heated at 240° F. for 10 minutes and then for an additional 10 minutes at 300° F. The other film, 3(b), was heated at 300° F. for 10 minutes only.

Two films, (a) and (b), were also prepared from the solution of Example 4 by depositing portions of the solution on metal foil strips. Films 4(a) and 4(b) were then heated in the same manner as described for films 3(a) and 3(b), respectively.

The films prepared from Examples 3 and 4 which had a dried thickness of about 20 mils were inspected for blistering and also for the degree of cure. The results are set forth in Table II below.

TABLE II

| Heating Cycle | Film (a) 10 min. at 240° F. + 10 min. at 300° F. | Film (a) 10 min. at 300° F. | Film (b) 10 min. at 300° F. |
|---|---|---|---|
| Example 3 (non-activated): | | | |
| (1) Blisters | None | Many | Many. |
| (2) Cure | Incomplete | Incomplete | Incomplete. |
| Example 4 (activated): | | | |
| (1) Blisters | None | None | Many. |
| (2) Cure | Complete | Complete | Complete. |

It is evident from the results given in Table II that neither the one-stage nor two-stage heating cycles was sufficient to completely cure films (a) and (b) prepared from the non-activated solution of Example 3. However, film 4(a) prepared from the activated solution was completely cured after being heated for 10 minutes at 240° F. and film 4(b) was completely cured after being heated for 10 minutes at 300° F.

Blistering of the film occurred in all of the samples except sample 4(a) where complete curing of the coating had been effected before the composition was subjected to the higher temperature. Though sample 4(b) was completely cured after 10 minutes at 300° F., the rapid expulsion of the solvating medium at this temperature apparently caused disruption of the film before any substantial amount of curing had taken place. In samples 3(a) and 3(b), blistering occurred as the solvent was expelled from the weak, partially cured mass.

From the foregoing description and examples illustrating the present invention, it is readily apparent that the present method greatly enhances the usefulness of solvent-based compositions for many applications. In addition to the formation of relatively thick, blister-free gaskets for container closures, the present method is suitable for the preparation of coated articles and dipped goods. For example, in preparing coated fabrics it is possible to apply a heavier coating in a single pass through the coating machinery and also, possible to eliminate the calendering step often employed to apply a thick layer when heavy coatings are desired. Articles prepared by dipping a form into an elastomeric solution could be forced dry at a great savings in time. The present method is also adaptable to slush molding processes and to the preparation of large sheets of expanded rubber since the compositions employed in the method are gelled by heat. In these and other applications, the present method offers increased efficiency and speed of operation while the rubber articles produced are free from imperfections.

We claim:

1. A method of preparing blister-free films of an elastomeric polymer which comprises depositing a layer of a heat-activable solution of a curable elastomeric polymer dissolved in a volatile organic solvent on a substrate, curing said polymer at a temperature below the boiling point of said solvent, and thereafter volatilizing substantially all of said solvent.

2. A method of preparing blister-free films of an elastomeric polymer which comprises depositing a layer of a solution of a curable elastomeric polymer dissolved in a volatile organic solvent on a substrate, heating the deposited layer at a temperature below the boiling point of the solvent to cure said polymer, and further heating said layer to volatilize and expel substantially all of said solvent from said layer.

3. A method of preparing blister-free films of an elastomeric polymer which comprises:
   (1) depositing a layer of solution on a substrate, said solution comprising:
      (a) an elastomeric polymer,
      (b) a volatile organic solvent for said polymer,
      (c) a curing agent, and
      (d) a curing accelerator
   (2) heating the deposited layer at a temperature at least 80 degrees Fahrenheit below the boiling point of said solvent to cure said polymer and thereafter,
   (3) heating the deposited layer at a temperature at which substantially all of said solvent volatilizes to dry said layer.

4. A method according to claim 3 wherein said curing agent is elemental sulfur and said curing accelerator is an activated dithiocarbamate.

5. A method according to claim 4 wherein said polymer is natural rubber and said solvent comprises a mixture of an aromatic petroleum solvent having a boiling range between about 321° and 345° F. and an aliphatic petroleum solvent having a boiling range between about 321° and 388° F.

6. A method according to claim 5 wherein said deposited layer is heated at a temperature below about 240° F. to cure said polymer.

7. A method according to claim 6 wherein said solution contains an inorganic filler.

8. A method according to claim 4 wherein said polymer is a copolymer of butadiene and acrylonitrile and said solvent comprises a mixture of diisobutyl ketone having a boiling point of about 334° F. and an aromatic petroleum solvent having a boiling range between about 321° and 345° F.

9. A method according to claim 8 wherein said deposited layer is heated at a temperature below about 240° F. to cure said polymer.

10. A method according to claim 9 wherein said solution contains an inorganic filler.

11. A method of preparing blister-free films of an elastomeric polymer which comprises
   (1) depositing on a substrate a layer of solution comprising
      (a) natural rubber,
      (b) a volatile organic solvent consisting of a mixture of an aromatic petroleum solvent having a boiling range between about 321° and 345° F., and an aliphatic petroleum solvent having a boiling range between about 321° and 388° F.,
      (c) finely divided calcium carbonate,
      (d) elemental sulfur, and
      (e) an activated dithiocarbamate,
   (2) heating the deposited layer at a temperature of about 240° F. to cure said rubber, and thereafter
   (3) heating the deposited layer at a temperature of about 300° F. to remove substantially all of said solvent from said layer.

12. A method according to claim 11 wherein said substrate is a closure cap having a top panel and a dependent skirt and said layer is deposited on the inner-annular surface of said cap.

13. A method according to claim 12 wherein said closure cap is an aerosol mounting cup.

14. A method according to claim 13 wherein the amount of calcium carbonate is between 100 and 300 parts by weight based on 100 parts by weight of rubber.

15. A method according to claim 14 wherein the total solids concentration of said solution is between about 50 and 70 percent by weight.

References Cited

UNITED STATES PATENTS

| | | | |
|---|---|---|---|
| 2,610,162 | 9/1952 | Hoffman | 117—162 |
| 2,950,503 | 8/1960 | McRae | 264—216 |
| 2,974,113 | 3/1961 | Dundel et al. | 117—162 |

ALFRED L. LEAVITT, *Primary Examiner.*

A. ROSENSTEIN, *Assistant Examiner.*